Figure 1:
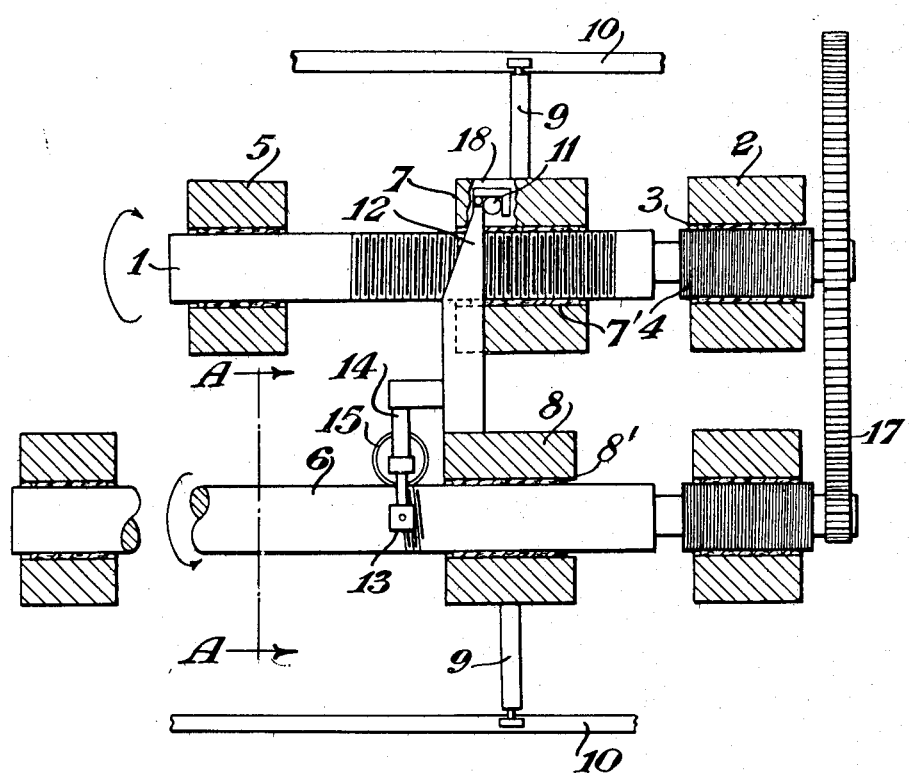

Sept. 13, 1955 A. C. G. MENZIES ET AL 2,717,401
DEVICE FOR CUTTING VERY FINE SCREW THREADS
Filed July 5, 1951 2 Sheets-Sheet 1

Inventors:
Alexander C. G. Menzies,
George Edwin Fensom, and
Walter Zehden; by their attorneys,
Baldwin & Wight

2,717,401

DEVICE FOR CUTTING VERY FINE SCREW THREADS

Alexander Charles George Menzies, Harrow-on-the-Hill, George Edwin Fensom, Ruislip, and Walter Zehden, London, England, assignors to Hilger & Watts Limited, London, England, a company of Great Britain Application July 5, 1951, Serial No. 235,198

Claims priority, application Great Britain July 18, 1950

8 Claims. (Cl. 10—101)

This invention relates to the making of accurate screws, and while it can be applied to fine screws generally, it has its greatest advantage in producing those of extremely small pitch, e. g. 15,000 turns per inch especially when a screw of considerable length is required. Such screws are of interest in the making of diffraction gratings, or for precision instruments.

It is already known (Proc. Roy. Soc. A, vol. 201, pp. 187–191, March 22, 1950) that fine screws may be made by the use of the nut line with cork or other flexible material, invented by Sir Thomas Merton. In that process, a screw thread (herein called the "master-thread") is cut as well as may be by standard methods, normally in a screw-cutting lathe. This master-thread is imperfect, and may easily have periodic error. Such a master-thread is cut at one end of a well-polished true cylinder, and a cork-lined nut is clamped on the master-thread. Attached to this nut is a holder carrying a cutting tool, e. g. a diamond, which is applied to the cylinder at a distance from the nut. If now, the cylinder is rotated, and the nut prevented from rotating by an outrigger, riding on a flat surface parallel to the axis of the cylinder, the nut will move along the cylinder, and the diamond will cut a secondary screw thread on the cylinder. In this secondary thread, the periodic error in the master-thread is sensibly absent, owing to the averaging effect of the flexible lining of the nut. Sometimes a portion of master-thread is cut near each end of the bar, and two cork-lined nuts ride on these portions, supporting the diamond between them so that it cuts a secondary thread on the clear space between. It will be seen that this process requires: (1) that the length of the cylinder must exceed twice the length of the secondary screw, plus the width of the nut, plus the length devoted to bearings, and (2) that the pitch of the master-thread must be equal to that required for the secondary thread.

The object of the present invention is to overcome these limitations.

The invention overcomes the first of these limitations by constructing the device so that the control of the tool forming the secondary thread is, in the course of its progress, changed from nut engagement with a master-thread to nut engagement with the secondary thread itself. The master-thread need not be formed on the cylinder on which the secondary thread is formed but, as will be seen later, it may be formed on another rotating cylinder (hereinafter called the primary cylinder) and engaged by a nut whose movement advances a tool-carrying nut on a cylinder (hereinafter called the secondary cylinder) on which the secondary thread is to be cut, until the latter nut has effectively engaged the secondary thread, so far formed, to take over from the nut on the primary cylinder the continued advancement of the tool.

Accordingly, the diamond which cuts the secondary thread is mounted close to the nut which carries it. After the master-thread has been cut for a sufficient distance for the nut to be able to grip it, the nut is put in place, and the cylinder rotated. The diamond cuts a thread, sensibly free from periodic error, and as the nut advances, it climbs on to the thread which the diamond has cut, and so moves forward, eventually propelled by the thread which it itself has cut. Thus, for example, it has been found sufficient for starting purposes to have only ½" of master-thread cut of pitch 5,000 threads per inch, and the nut has cut over 4" length of good secondary thread. Of course, the length of good secondary thread may be as long as desired, provided the cylinder is made sufficiently long. Further, it will be observed that the secondary thread becomes more nearly perfect, since the guiding-thread rapidly improves.

It will be appreciated that when we refer herein to "nut" we mean a nut lined with cork or equivalent flexible or deformable material, preferably in segmental strips.

As has been mentioned, the device according to the invention may comprise two cylinders, a primary one on which a relatively coarse master-thread is cut, by any normal means, such as a screw-cutting lathe. This primary cylinder is placed parallel to the secondary one, on which the master-thread of finer pitch is to be cut. The two cylinders need not have the same diameters or lengths.

The primary cylinder carries a nut, prevented from rotation by an outrigger. This cylinder is driven by well-cut reduction gears (or similar means) by the rotation of the secondary cylinder. Thus, for example, the primary cylinder may rotate 32 times more slowly than the secondary cylinder.

The nut riding on the primary cylinder may be surmounted by a post, which bears on a catch on a nut riding on the secondary cylinder. Thus, if the primary cylinder carries a thread of 100 threads per inch, a diamond attached to the nut on the secondary cylinder and applied to the secondary cylinder will cut on it a thread 32 times finer, i. e. of 3,200 threads per inch. This overcomes the aforementioned limitation (2).

According to a further feature of the invention the nut carrying the tool or diamond which forms the secondary thread may carry a second or trailing tool or diamond working in the secondary thread which has been propelling the nut and which the nut has passed beyond. The purpose of this is to clear and/or modify the shape of the grooves of the thread.

The secondary thread produced is suitable for the production of diffraction gratings, but it may be required to produce others differing in groove form but having the same grating space (and therefore the same pitch of thread on the cylinder). This in turn may require that the cylinder from which the grating is to be made be of a softer material, or have a surface of a soft character, such as might be seriously harmed by the riding on it of a cork lined nut. This is achieved by a further feature of the invention which is as follows:

The ruling on the secondary cylinder is transferred to a tertiary cylinder mounted parallel to the secondary cylinder and connected by 1:1 gearing. The transfer can be effected simultaneously with the ruling of the secondary cylinder but it is preferably done subsequently.

In the process of transfer the secondary cylinder is accordingly used as a control screw having a fine pitch and it carries a nut lined with cork or similar flexible material. This nut is provided with an outrigger running on a flat to prevent its rotation, and with an arm carrying a diamond for engraving the tertiary cylinder.

On the rotation of the secondary and tertiary cylinders the diamond engraves on the tertiary cylinder a fine ruling substantially free from periodic error. This occurs, in spite of possible faults in the gears, owing to the fact that the gear ratio is 1:1. The turns of the threads on the tertiary cylinder are parallel to one another even through they are not necessarily of perfect helical form. Because of the parallelism, the ruling on the tertiary cylinder is not vitiated as a grating.

Since only the diamond rides on the tertiary cylinder there is no blemishing of the surface.

Figure 2:
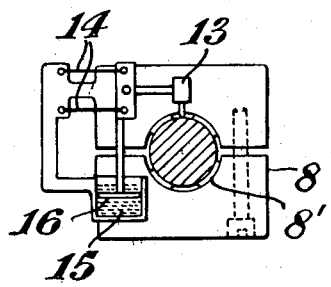

The invention is illustrated by way of example in the accompanying drawings of which Figure 1 is a plan view; Figure 2 an end view looking in the direction A—A of Figure 1; and Figure 3 a plan view of a device auxiliary to that shown in Figure 1.

The primary cylinder 1 is mounted at one end by a bearing 2 having a lining of segmental strips of cork or similar flexible material 3, bearing upon a thread of zero pitch 4 (a series of parallel circular grooves cut in the cylinder, not necessarily equidistant ones) cut in one end of the primary cylinder. The other end is supported in another cork-lined bearing 5, but the primary cylinder is at this end smooth. Thus, motion of the cylinder as a whole in a direction parallel to its axis is prevented by the zero-pitch thread at the first end, while expansion of the cylinder in this direction can take place since the other end is supported but not fixed.

The secondary cylinder 6 is similarly mounted.

The nut 7 cork-lined at 7' on the primary cylinder, and that 8, cork-lined at 8', on the secondary cylinder, are both prevented from rotating by similar but separate outriggers 9, running on flats 10 mounted parallel to the cylinders.

The sole purpose of the nut on the primary cylinder is to propel the nut on the secondary cylinder, during the time while the master-thread is being transferred (and diminished in pitch) to the secondary cylinder. This is effected by a post 11 on the primary nut bearing on an arm 12 attached to the secondary nut.

With nuts having linings of, say, 1" in length, it is necessary only to have 2" of master-thread on the primary cylinder, to transfer 1" of thread to the secondary one.

The nut on the secondary cylinder carries the diamond-holder 13 designed so that the cutting position of the diamond can be varied in any suitable manner, and so that the pressure of the diamond upon the bar can be varied within required limits. A convenient design makes use of leaf springs 14. A dash-pot 15 is also carried by the nut, and a damping disc 16 is immersed in liquid in the pot, so that the motion of the diamond in a direction to or from the cylinder may be damped.

The gear-ratio 17 between the two cylinders may be changed at will, and when it is required to free the secondary nut from the driving action of the primary one, a quick-release catch 18 is provided, and the gears may be disengaged, so that the nut cutting on the secondary cylinder may proceed, guided only by the thread on which it rests, and freed from the driving action of the nut on the primary cylinder.

It will be seen that the effects of the two nuts are as follows:

At the beginning of the process, the primary cylinder carries a relatively poor master-thread, on which the primary nut rides. By propelling forward the secondary nut, the primary nut causes a secondary master-thread to be cut on the secondary cylinder, which should be free from the periodic error in the primary thread, owing to the averaging action of the flexible lining of the primary nut.

The gears cause the two cylinders to rotate at different speeds, so that the secondary master-thread is of finer pitch than the primary one. But owing to their imperfections, the gears may introduce a periodic error in the secondary master-thread.

The secondary nut, when freed from the control of the primary nut, riding on this imperfect secondary master-thread, owing to its flexible lining, averages out the error, and cuts a good final thread, and since it moves on to this thread, continues to cut for as long as the secondary cylinder is turned or until the diamond reaches the end of this cylinder.

Figure 3:
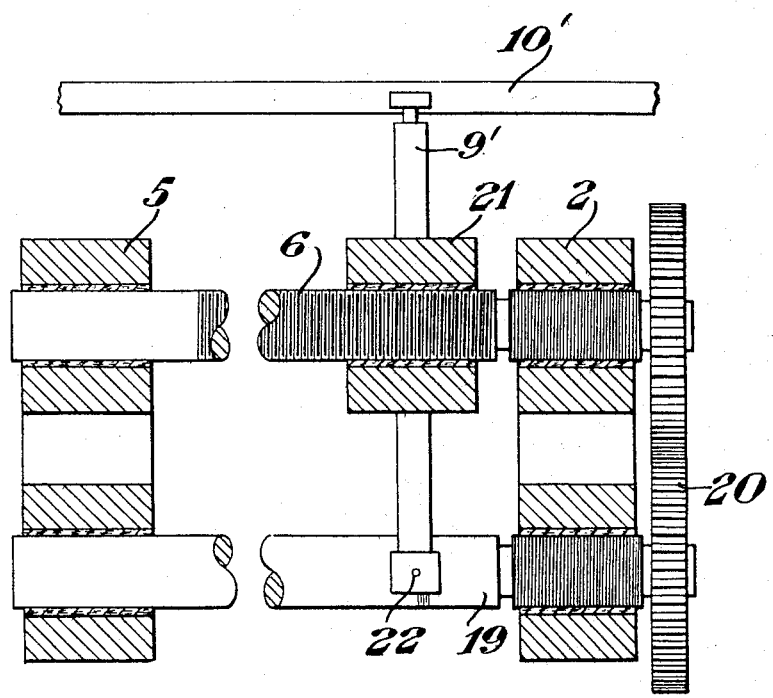

Referring to Figure 3, the cylinder 6 is that on which a secondary thread has been cut in the manner described with reference to Figures 1 and 2. A cork-lined nut 21 is mounted on this cylinder and is prevented from rotating by an out-rigger 9' running on a flat 10'. This nut carries a diamond tool 22 for cutting a thread on a tertiary cylinder 19. The two cylinders, which are mounted at their ends in cork-lined bearings in the same manner as the cylinders shown in Figure 1 are interconnected by 1:1 gearing 20. On rotation of the gearing the diamond tool 22, propelled by the nut 21, cuts on the tertiary cylinder 19, a fine ruling sensibly free from periodic error, and since only the diamond runs on the tertiary bar there is no blemishing of the surface.

We claim:

1. Device for making fine screws comprising a primary rotary cylinder carrying a master thread and a secondary rotary cylinder upon which a secondary thread is to be made, the two cylinders being mounted parallel to one another and being disengageably interconnected to be rotated at predetermined relative speeds, a nut lined with flexible material mounted on said master thread, a like nut mounted on the secondary cylinder, means interconnecting the two said nuts so that they travel in unison, means for disengaging the last-mentioned means after the said like nut has engaged the cut screw-thread on the secondary cylinder, and a cutting tool carried by the second said nut on the secondary cylinder to be advanced thereby and to cut the said secondary thread, said primary thread being of sufficient extent to enable the flexible means of the second nut to interengage with the thread cut in the second cylinder to thereby transfer the feed of the cutting tool from the master thread to the secondary thread.

2. Device as claimed in claim 1 in which at least one of said cylinders carries a zero-pitch thread and is mounted in a bearing lined with flexible material meshing with said thread.

3. Device for making fine screws comprising a rotary cylinder carrying a preformed thread, a nut lined with flexible material meshing with said thread, means for constraining said nut against rotation, a cutting tool connected to said nut so as to receive the longitudinal movement of said nut, a second rotary cylinder upon which said cutting tool operates, a nut lined with flexible material mounted on said second rotary cylinder, and means interconnecting said two nuts; said preformed thread being of sufficient extent to enable the flexible material of the second nut to interengage with the thread cut in the second cylinder to thereby transfer the feed of the cutting tool from the preformed thread to the secondary thread, the two cylinders being mounted parallel to one another and being interconnected to be rotated at equal speeds and means to release the cutting tool from the first-mentioned nut after the second-mentioned nut has engaged the screw thread on the second cylinder.

4. Device for making fine screws comprising a primary cylinder provided with a master screw-thread, a nut having a flexible lining in its bore interengaged with said master screw-thread so that rotation of the cylinder will slidingly advance said nut, a secondary cylinder, means to rotate said cylinders, a nut on said secondary cylinder having a flexible lining in its bore, said nuts being unitarily slidable, a screw thread-cutting tool means slidable with said nuts and disposed in screw-thread cutting engagement with said secondary cylinder in advance of the second nut, the master screw thread extending a distance sufficient for sliding advance of said nuts to interengage the flexible lining of the second nut with the screw-threads cut by said tool means to transfer the feed of the said tool means from the master screw-thread to the cut screw-thread and means to release the said tool from operation by the first nut after the second nut has engaged the cut screw-thread on the secondary cylinder.

5. Device for making fine threads from a rotating cylinder having a master thread thereon, means to rotate said cylinder, a nut having flexible material in its bore and interengaged in propelling relation with said thread, a nut slidable unitarily with said first nut and with respect to a secondary cylinder passing through its bore, and thread cutting means in unitary relation with said nuts disposed foremost in the line of advance thereof to thread a rotating secondary cylinder passing through the bore of the second nut, and said second nut in the latter bore having flexible material disposed to interengage through sliding movement of said nuts the thread made by said cutting means to thereby transfer the feed for the cutting means from the master thread to the secondary thread and means to release the said thread cutting means from operation by the first nut after the second nut has engaged the cut screw-thread on the secondary cylinder.

6. Method of making a fine thread from a rotating means having a master thread, comprising sliding a nut through interengagement of flexible material in its bore with said master thread, cutting a secondary thread on another rotating means driven by the first rotating means with a tool operated through said sliding movement and through sliding movement along said another rotating means by a nut having flexible material in its bore, interengaging the latter flexible material with the secondary thread and thereby transferring feed of the cutting tool from the master thread to the secondary thread and thereafter feeding the cutting tool solely from the secondary thread.

7. Process as claimed in claim 6 in which the secondary thread is cut with a reduced pitch as compared with the master thread.

8. Process as claimed in claim 6 in which after the secondary thread is cut a thread is reproduced from it upon a tertiary cylinder cut by a tool propelled by engagement of the flexible lining of the second-mentioned nut with the secondary thread.

References Cited in the file of this patent

UNITED STATES PATENTS

| | | |
|---|---|---|
| 62,500 | Purdy | Feb. 26, 1867 |
| 1,939,444 | Geyer | Dec. 12, 1933 |
| 2,286,715 | Cheever | June 16, 1942 |

OTHER REFERENCES

Proc. Roy. Soc. (London), Series A, vol. 201, pp. 187–191, March 22, 1950.